(12) United States Patent
Uehira et al.

(10) Patent No.: US 12,537,219 B2
(45) Date of Patent: Jan. 27, 2026

(54) METHOD FOR MANUFACTURING ENERGY STORAGE DEVICE

(71) Applicant: GS Yuasa International Ltd., Kyoto (JP)

(72) Inventors: Kenta Uehira, Kyoto (JP); Masashi Takano, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 432 days.

(21) Appl. No.: 17/635,511

(22) PCT Filed: Aug. 19, 2020

(86) PCT No.: PCT/JP2020/031187
§ 371 (c)(1),
(2) Date: Feb. 15, 2022

(87) PCT Pub. No.: WO2021/033697
PCT Pub. Date: Feb. 25, 2021

(65) Prior Publication Data
US 2022/0320568 A1    Oct. 6, 2022

(30) Foreign Application Priority Data
Aug. 20, 2019   (JP) .................................. 2019-150700

(51) Int. Cl.
*H01M 10/04*   (2006.01)
*H01M 10/0525*   (2010.01)
(Continued)

(52) U.S. Cl.
CPC ..... *H01M 10/049* (2013.01); *H01M 10/0431* (2013.01); *H01M 10/0525* (2013.01);
(Continued)

(58) Field of Classification Search
CPC ............. H01M 10/0431; H01M 10/34; H01M 10/0525; H01M 10/0587; H01M 10/049;
(Continued)

(56) References Cited

U.S. PATENT DOCUMENTS 9,172,072 B2   10/2015   Shibata et al.
2003/0175583 A1   9/2003   Suzuki
(Continued)

FOREIGN PATENT DOCUMENTS

JP   10-40958 A2   2/1989
JP   6-150975 A    5/1994
(Continued)

OTHER PUBLICATIONS

Greatbatch et al, "The Solid-State Lithium Battery: A New Improved Chemical Power Source for Implantable Cardiac Pacemakers," in IEEE Transactions on Biomedical Engineering, vol. BME-18, No. 5, pp. 317-324, Sep. 1971. (Year: 1971).*
International Search Report (ISR) dated Nov. 10, 2020 filed in PCT/JP2020/031187.

*Primary Examiner* — A. Dexter Tugbang
(74) *Attorney, Agent, or Firm* — RANKIN, HILL & CLARK LLP

(57) ABSTRACT

A method for manufacturing an energy storage device according to one aspect of the present invention includes: housing, in a case, an electrode assembly in which a negative electrode and a positive electrode are stacked; housing an electrolyte solution in the case; housing a gas, soluble in the electrolyte solution, in the case after the electrolyte solution is housed in the case; and sealing the case in a state where the gas soluble in the electrolyte solution is housed in the case.

11 Claims, 4 Drawing Sheets

(51) Int. Cl.
  *H01M 10/0587* (2010.01)
  *H01M 10/34* (2006.01)
  *H01M 10/44* (2006.01)
  *H01G 11/20* (2013.01)
  *H01G 11/78* (2013.01)
  *H01M 50/10* (2021.01)

(52) U.S. Cl.
  CPC ....... *H01M 10/0587* (2013.01); *H01M 10/34* (2013.01); *H01M 10/446* (2013.01); *H01G 11/20* (2013.01); *H01G 11/78* (2013.01); *H01M 50/10* (2021.01)

(58) Field of Classification Search
  CPC .... H01M 50/10; H01M 10/446; H01G 11/20; H01G 11/78
  See application file for complete search history.

(56) References Cited

U.S. PATENT DOCUMENTS

| | | | |
|---|---|---|---|
| 2006/0003226 A1 | 1/2006 | Sawa et al. | |
| 2010/0216016 A1* | 8/2010 | Seino | H01M 10/0525 429/185 |
| 2013/0081264 A1 | 4/2013 | Egusa et al. | |
| 2013/0115490 A1 | 5/2013 | Kim et al. | |
| 2013/0171483 A1 | 7/2013 | Shibata et al. | |
| 2014/0045015 A1* | 2/2014 | Yokoyama | H01M 10/0431 429/94 |
| 2014/0363715 A1* | 12/2014 | Toyoda | H01M 10/0431 252/182.1 |
| 2015/0207182 A1* | 7/2015 | Tsukui | H01M 10/0431 429/185 |
| 2017/0005368 A1 | 1/2017 | Mitsuhashi | |

FOREIGN PATENT DOCUMENTS

| | | | |
|---|---|---|---|
| JP | 8-64246 A | 3/1996 | |
| JP | 2001-307771 A | 11/2001 | |
| JP | 2003-157898 A | 5/2003 | |
| JP | 2005-190901 A | 7/2005 | |
| JP | 2007-165125 A | 6/2007 | |
| JP | 2010-153337 A | 7/2010 | |
| JP | 2010-257989 A | 11/2010 | |
| JP | 2013-41781 A | 2/2013 | |
| JP | 2013-77404 A | 4/2013 | |
| JP | 2013-80698 A | 5/2013 | |
| JP | 2013-98167 A | 5/2013 | |
| JP | 2013143224 A | 7/2013 | |
| JP | 2014/010024 A1 | 1/2014 | |
| JP | 2014-123526 A | 7/2014 | |
| JP | 2014-203781 A | 10/2014 | |
| JP | 2014212060 A * | 11/2014 | ............ H01M 10/04 |
| JP | 2015092493 A | 5/2015 | |
| JP | 2016-154123 A | 8/2016 | |
| JP | 2019-46792 A | 3/2019 | |
| JP | 2019-61823 A | 4/2019 | |
| JP | 2020-123434 A | 8/2020 | |
| WO | 02/091514 A1 | 11/2002 | |
| WO | 2017/098918 A1 | 6/2017 | |

* cited by examiner

METHOD FOR MANUFACTURING ENERGY STORAGE DEVICE

TECHNICAL FIELD

The present invention relates to a method for manufacturing an energy storage device and an energy storage device.

BACKGROUND ART

Nonaqueous electrolyte solution secondary batteries typified by lithium ion nonaqueous electrolyte solution secondary batteries are widely in use for electronic equipment such as personal computers and communication terminals, automobiles, and the like because the batteries have high energy density. The nonaqueous electrolyte solution secondary battery is generally provided with an electrode assembly, having a pair of electrodes electrically isolated by a separator, and a nonaqueous electrolyte solution interposed between the electrodes and is configured to charge and discharge by transferring ions between both the electrodes. Capacitors such as lithium ion capacitors and electric double-layer capacitors are also widely in use as energy storage devices except for the nonaqueous electrolyte solution secondary batteries.

For the purpose of improving characteristics such as a capacity retention ratio of such an energy storage device, for example, many studies have been made on an additive of an electrolyte solution (see Patent Document 1).

PRIOR ART DOCUMENT

Patent Document

Patent Document 1: JP-A-2007-165125

SUMMARY OF THE INVENTION

Problems to be Solved by the Invention

However, depending on the additive of the electrolyte solution, the additive may be decomposed along with initial charge-discharge to generate a gas such as carbon monoxide. When the gas is generated by the initial charge-discharge, gas accumulation occurs between the electrodes, and a distance between the electrodes is likely to partially increase. As a result, current unevenness may occur, and metal lithium electrodeposition may occur in the vicinity of the increased inter-electrode distance. In addition, even when the electrolyte solution contains no additive, a gas is generated by oxidation-reduction decomposition of the electrolyte solution, so that the inter-electrode distance may partially increase.

The present invention has been made in view of the above circumstances, and an object of the present invention is to provide a method for manufacturing an energy storage device and an energy storage device capable of suppressing an increase in inter-electrode distance.

Means for Solving the Problems

A method for manufacturing an energy storage device according to one aspect of the present invention made to solve the above problems includes: housing, in a case, an electrode assembly in which a negative electrode and a positive electrode are stacked; housing an electrolyte solution in the case; housing a gas, soluble in the electrolyte solution, in the case after the electrolyte solution is housed in the case; and sealing the case in a state where the gas soluble in the electrolyte solution is housed in the case.

An energy storage device according to another aspect of the present invention includes: an electrode assembly in which a negative electrode and a positive electrode are stacked; an electrolyte solution; a gas soluble in the electrolyte solution; and a sealable case for housing the electrode assembly, the electrolyte solution, and the gas, in which an inside of the case has an atmosphere in a negative pressure state.

Advantages of the Invention

According to the present invention, it is possible to provide a method for manufacturing an energy storage device and an energy storage device capable of suppressing an increase in inter-electrode distance.

MODE FOR CARRYING OUT THE INVENTION

Figure 1:
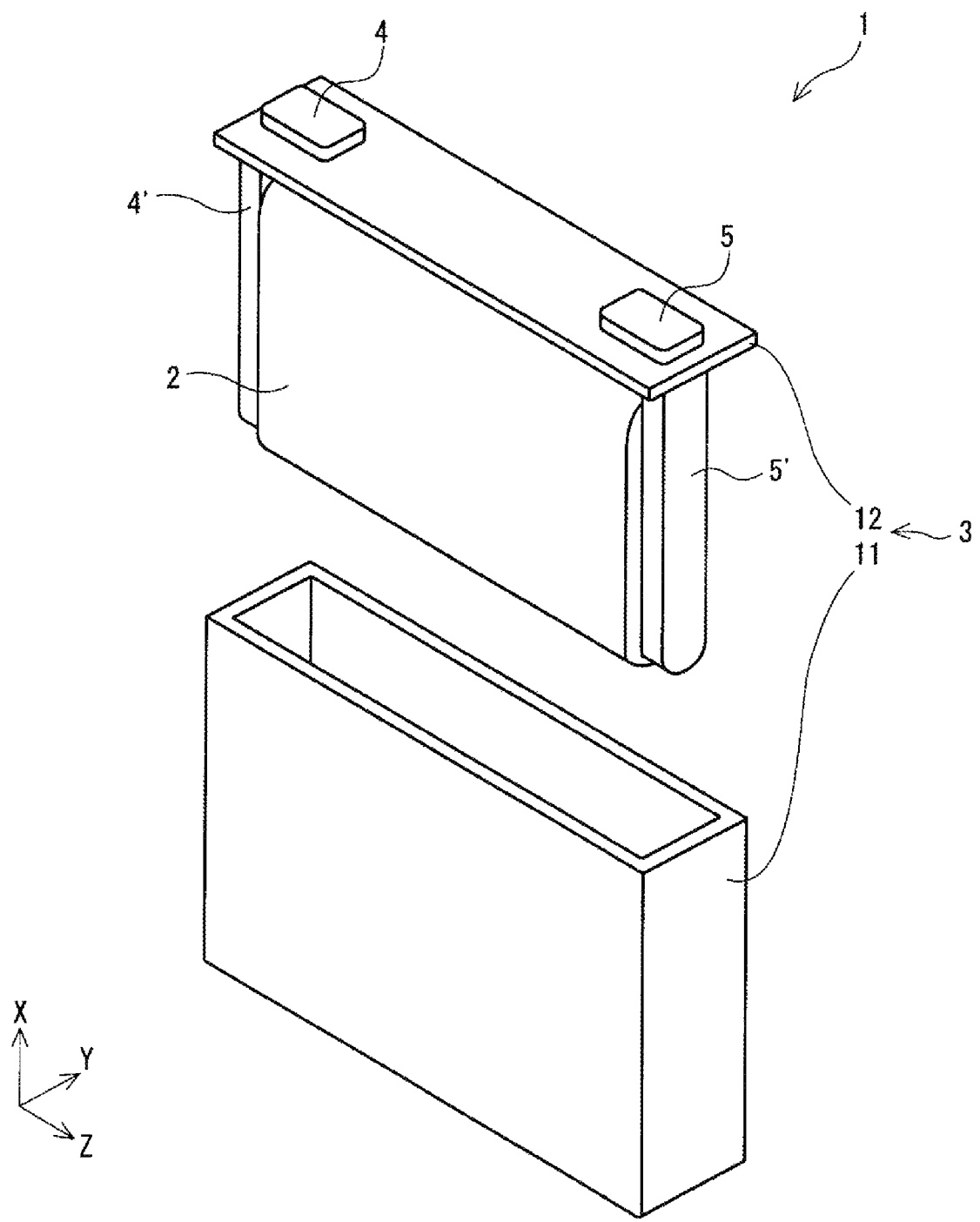
FIG. 1 is a schematic exploded perspective view illustrating an energy storage device in one embodiment of the present invention.

A method for manufacturing an energy storage device according to one aspect of the present invention includes: housing, in a case, an electrode assembly in which a negative electrode and a positive electrode are stacked; housing an electrolyte solution in the case; housing the electrolyte solution in the case and then housing a gas, soluble in the electrolyte solution, in the case; and sealing the case in a state where the gas soluble in the electrolyte solution is housed in the case.

The method for manufacturing an energy storage device includes the steps described above, thereby making it possible to manufacture an energy storage device having a high effect of suppressing occurrence of metal lithium electrodeposition associated with an increase in inter-electrode distance at the time of decomposition of an additive in initial charge-discharge or oxidation-reduction decomposition of the electrolyte solution. The reason for this is unknown but is considered as follows. In general, in the energy storage device, a gas is generated in the case along with decomposition of the additive or oxidation-reduction decomposition of the electrolyte solution in the initial charge-discharge. When the gas is generated between the electrodes, gas accumulation occurs between the electrodes due to the presence of the gas, so that the inter-electrode distance increases. As a result, current unevenness may occur, and metal lithium electrodeposition may occur in the vicinity of the increased inter-electrode distance. However, in the method for manufacturing the energy storage device, after the electrolyte solution is housed in the case, a gas soluble in the electrolyte solution is housed in the case, and the case is sealed in a state where the gas is housed in the case, so that the gas is dissolved in the electrolyte solution after the sealing. As a result, pressure inside the case decreases, and the inside of the case is brought into a negative pressure state, that is, a force for pulling the case inward is generated, whereby the gas present between the electrodes is discharged to the outside of the electrode assembly. Therefore, it is presumed that the method for manufacturing an energy storage device can manufacture the energy storage device capable of suppressing occurrence of metal lithium electrodeposition since the increase in inter-electrode distance is suppressed.

The "gas soluble in the electrolyte solution" in the present invention refers to a gas having a solubility of $1 \text{ cm}^3$ or more in $1 \text{ cm}^3$ of the electrolyte solution at 25° C. under 1 atm.

The electrode assembly is a wound electrode assembly including a pair of curved portions facing each other and a flat portion located between the pair of curved portions, and after the electrode assembly is housed and before the electrode assembly is sealed, when the electrode assembly has a hollow region in a central portion as viewed in a winding axis direction, when a gap is present between an outer surface of the flat portion of the electrode assembly and an inner surface of the case, or in the case of a combination thereof, the effect of the method for manufacturing an energy storage device can be further exhibited. As described above, when the wound electrode assembly includes the pair of curved portions facing each other and the flat portion located between the pair of curved portions, and after the electrode assembly is housed and before the electrode assembly is sealed, when the electrode assembly has the hollow region in the central portion as viewed in the winding axis direction, when the gap is present between the outer surface of the flat portion of the electrode assembly and the inner surface of the case, or in the case of the combination thereof, in the flat portion of the electrode assembly, the inter-electrode distance is easily widened toward the hollow region in the central portion or the gap on an outer surface side of the flat portion. Thus, the inter-electrode distance is more likely to be increased by the gas generated in these spaces by the decomposition of the additive or the oxidation-reduction decomposition of the electrolyte solution in the initial charge-discharge, and metal lithium electrodeposition is more likely to occur. According to the method for manufacturing an energy storage device, even in such a case, it is possible to manufacture an energy storage device having a high effect of suppressing occurrence of metal lithium electrodeposition associated with the increase in inter-electrode distance.

A main component of the electrolyte solution is preferably carbonate, and the gas is preferably carbon dioxide. When the main component of the electrolyte solution is carbonate, the solubility of the gas in the electrolyte solution can be enhanced by using carbon dioxide as the gas. Here, the "main component" refers to, for example, a component contained in an amount of 50% by mass or more with respect to a total mass of the electrolyte solution.

The electrolyte solution preferably contains an oxalato complex salt. Among the additives used in the electrolyte solution, the oxalato complex salt generates a large amount of gas that is hardly dissolved in the electrolyte solution such as carbon monoxide in the initial charge-discharge. Thus, gas such as carbon monoxide is more likely to be accumulated between the electrodes, and the inter-electrode distance is likely to increase. According to the method for manufacturing an energy storage device, even in such a case, it is possible to manufacture an energy storage device having a high effect of suppressing the increase in inter-electrode distance.

It is preferable that the case has a flat bottomed rectangular tube-shaped case body and a lid body, and the electrode assembly is in direct or indirect contact with an inner surface of the case body after the case is sealed. Since the case body has a flat bottomed rectangular tube shape, when the inside of the case is in the negative pressure state, the force for pulling the case inward is generated, whereby the side surface of the case body is easily recessed. Since the electrode assembly is in direct or indirect contact with the inner surface of the case body, the side surface of the electrode assembly facing the side surface of the case body recessed by the negative pressure is pressurized in a thickness direction, so that the gas between the electrodes is more easily discharged to the outside of the electrode assembly. Therefore, the effect of suppressing the increase in inter-electrode distance can be further enhanced.

The method for manufacturing the energy storage device preferably further includes housing a member, capable of adsorbing the gas, in the case. The method for manufacturing the energy storage device further includes housing the member, capable of adsorbing the gas, in the case, so that an amount of absorption of the gas increases, and the negative pressure inside the case also increases, whereby the gas between the electrodes is more easily discharged to the outside of the electrode assembly, and therefore, the effect of suppressing the increase in inter-electrode distance can be further improved. Since the gas is also absorbed by the adsorbable member, it is possible to shorten the time until the inside of the case attains an atmosphere in the negative pressure state after the case is sealed.

An energy storage device according to another aspect of the present invention includes: an electrode assembly in which a negative electrode and a positive electrode are stacked; an electrolyte solution; a gas soluble in the electrolyte solution; and a sealable case for housing the electrode assembly, the electrolyte solution, and the gas, in which an inside of the case has an atmosphere in a negative pressure state.

According to the energy storage device having the above configuration, after the electrolyte solution is housed in the case, the gas soluble in the electrolyte solution is housed in the case, and the case is sealed, whereby the gas is dissolved in the electrolyte solution. As a result, pressure inside the case decreases, and the inside of the case is brought into the negative pressure state, that is, the force for pulling the case inward is generated, whereby the gas present between the electrodes is discharged to the outside of the electrode assembly. Therefore, the energy storage device has a high effect of suppressing occurrence of metal lithium electrodeposition since the increase in inter-electrode distance is suppressed. Here, the "atmosphere" refers to a gas housed in a surplus space inside the case. In addition, "the inside of the case has the atmosphere in the negative pressure state" means that the pressure of the surplus space in the case is lower than the pressure outside the case.

Hereinafter, the method for manufacturing an energy storage device according to the present invention will be described in detail. As an example of the method for manufacturing an energy storage device, a method for manufacturing a nonaqueous electrolyte secondary battery (particularly, a lithium ion secondary battery) will be described, but it is not intended to limit the application target of the present invention.

<Method for Manufacturing Energy Storage Device>

A method for manufacturing an energy storage device according to one embodiment of the present invention includes: housing, in a case, an electrode assembly in which a negative electrode and a positive electrode are stacked (hereinafter, also referred to as the electrode assembly housing step); housing an electrolyte solution in the case (hereinafter, also referred to as the electrolyte solution housing step); housing the electrolyte solution in the case and then housing a gas, soluble in the electrolyte solution, in the case (hereinafter, also referred to as the gas housing step); and sealing the case in a state where the gas soluble in the electrolyte solution is housed in the case (hereinafter, also referred to as the sealing step). The method for manufacturing the energy storage device preferably further includes housing a member, capable of adsorbing the gas, in the case (hereinafter, also referred to as the adsorbing member housing step). In addition, as the other steps, the method for manufacturing an energy storage device may include, for example, forming a negative electrode (hereinafter, also referred to as the negative electrode forming step), forming a positive electrode (hereinafter, also referred to as the positive electrode forming step), and forming an electrode assembly (hereinafter, also referred to as the electrode assembly forming step).

[Negative Electrode Forming Step]

In the negative electrode forming step, a negative electrode having a negative electrode substrate and a negative composite layer is formed. In the negative electrode forming step, a negative composite containing the negative active material is applied to the negative electrode substrate, whereby the negative composite can be disposed along at least one surface of the negative electrode substrate. Specifically, for example, the negative composite is applied to the negative electrode substrate, and dried to dispose the negative composite layer.

The negative electrode substrate is a substrate having conductivity. As the material of the negative electrode substrate, a metal such as copper, nickel, stainless steel, or a nickel-plated steel or an alloy thereof is used, and copper or a copper alloy is preferable. Examples of the form of the negative electrode substrate include a foil, and a vapor deposition film, and a foil is preferred from the viewpoint of cost. That is, the negative electrode substrate is preferably a copper foil. Examples of the copper foil include rolled copper foil, electrolytic copper foil, and the like. Note that having "conductivity" means that the volume resistivity measured in accordance with JIS-H-0505 (1975) is $1\times10^7$ $\Omega\cdot$cm or less.

The negative composite forming the negative composite layer contains optional components such as a conductive agent, a binder, a thickener, a filler, or the like as necessary.

As the negative active material, a material capable of absorbing and releasing lithium ions is usually used. Specific examples of the negative active material include metals or metalloids such as Si and Sn; metal oxides or metalloid oxides such as an Si oxide and an Sn oxide; a polyphosphoric acid compound; carbon materials such as graphite and non-graphitic carbon (easily graphitizable carbon or hardly graphitizable carbon); and lithium-metal composite oxides such as lithium titanate.

The negative composite may also contain a typical non-metal element such as B, N, P, F, Cl, Br, or I, a typical metal element such as Li, Na, Mg, Al, K, Ca, Zn, Ga, or Ge, or a transition metal element such as Sc, Ti, V, Cr, Mn, Fe, Co, Ni, Cu, Mo, Zr, Ta, Hf, Nb, or W.

Examples of the conductive agent include carbonaceous materials, metals, and conductive ceramics. Examples of the carbonaceous material include graphitized carbon, non-graphitized carbon and graphene-based carbon. Examples of the non-graphitized carbon include carbon nanofibers, pitch-based carbon fibers and carbon black. Examples of the carbon black include furnace black, acetylene black and ketjen black. Examples of the graphene-based carbon include graphene, carbon nanotubes (CNTs), and fullerene. Examples of the shape of the conductive agent include a powdery shape and a fibrous shape. As the conductive agent, one of these materials may be used singly, or two or more of these materials may be mixed and used. In addition, these materials may be composited and used. For example, a material obtained by compositing carbon black with CNT may be used. Among them, carbon black is preferable, an in particular, acetylene black is preferable, from the viewpoint of electron conductivity and coatability.

Examples of the binder include: elastomer such as ethylene-propylene-diene rubber (EPDM), sulfonated EPDM, styrene-butadiene rubber (SBR), and fluororubber; and thermoplastic resins except for the elastomers, such as fluororesins (polytetrafluoroethylene (PTFE), polyvinylidene fluoride (PVDF), etc.), polyethylene, polypropylene, and polyimide; polysaccharide polymers.

Examples of the thickener include polysaccharide polymers such as cellulose derivatives such as carboxymethyl cellulose (CMC), methyl cellulose (MC), cellulose acetate phthalate (CAP), hydroxypropyl methyl cellulose (HPMC), and hydroxypropyl methyl cellulose phthalate (HPMCP). When the thickener has a functional group reactive with lithium, it is preferable to deactivate the functional group by methylation or the like in advance.

The filler is not particularly limited. Examples of the main component of the filler include polyolefins such as polypropylene and polyethylene, inorganic oxides such as silicon dioxide, alumina, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, barium sulfate and the like, nitrides such as aluminum nitride and silicon nitride, and substances derived from mineral resources, such as talc, montmorillonite, boehmite, zeolite, apatite, kaolin, mullite, spinel, olivine, sericite, bentonite and mica, and artificial products thereof.

The negative composite may be a negative composite paste containing a dispersion medium in addition to the optional components described above. As the dispersion medium, it is possible to use, for example, an aqueous solvent such as water or a mixed solvent mainly composed of water or an organic solvent such as N-methylpyrrolidone or toluene.

The negative composite layer may be stacked on the negative electrode substrate directly or via an intermediate layer. The configuration of the intermediate layer is not particularly limited but can be formed of, for example, a composition containing a resin binder and conductive particles. A negative electrode overcoat layer having at least inorganic particles and a binder may be provided on an upper surface of the negative composite layer. By providing the negative electrode overcoat layer, effects such as improvement in ion conductivity and reduction in possibility of short circuit can be obtained.

[Positive Electrode Forming Step]

In the positive electrode forming step, a positive electrode having a positive electrode substrate and a positive composite layer is formed. In the positive electrode forming step, a positive composite containing the positive active material is applied to the positive electrode substrate, whereby the positive composite can be disposed along at least one surface of the positive electrode substrate. Specifically, for example, the positive composite is applied to the positive electrode substrate, and dried to dispose the positive composite layer. The positive composite may be a positive composite paste containing a dispersion medium in addition to the optional components described above. The dispersion medium can be arbitrarily selected from those exemplified in the negative electrode forming step.

The positive electrode substrate has conductivity. As the material of the substrate, a metal such as aluminum, titanium, tantalum, stainless steel, or an alloy thereof is used. Among these, aluminum and aluminum alloys are preferable from the viewpoint of the balance of electric potential resistance, high conductivity, and cost. Examples of the form of the positive electrode substrate include a foil and a vapor deposition film, and a foil is preferred from the viewpoint of cost. That is, an aluminum foil is preferable as the positive electrode substrate. Note that examples of the aluminum or aluminum alloy include A1085P, A3003 and the like specified in JIS-H-4000 (2014).

The positive composite forming the positive active material layer contains optional components such as a conductive agent, a binder, a thickener, a filler, or the like as necessary.

The positive active material can be appropriately selected from, for example, known positive active materials. As a positive active material for a lithium ion secondary battery, a material capable of storing and releasing lithium ions is normally used. Examples of the positive active material include lithium transition metal composite oxides having an α-NaFeO$_2$-type crystal structure, lithium transition metal oxides having a spinel-type crystal structure, polyanion compounds, chalcogenides, and sulfur. Examples of the lithium transition metal composite oxide having an α-NaFeO$_2$ type crystal structure include Li[Li$_x$Ni$_{1-x}$]O$_2$ (0≤x<0.5), Li[Li$_x$Ni$_y$Co$_{(1-x-y)}$]O$_2$ (0≤x<0.5, 0<γ<1), Li[Li$_x$Co$_{(1-x)}$]O$_2$ (0≤x<0.5), Li[Li$_x$Ni$_y$Mn$_{(1-x-y)}$]O$_2$ (0≤x<0.5, 0<γ<1), Li[Li$_x$Ni$_y$Mn$_\beta$Co$_{(1-x-y)}$]O$_2$ (0≤x<0.5, 0<γ, 0<ß, 0.5<γ+ß<1), and Li[Li$_x$Ni$_y$Co$_\beta$Al$_{(1-x-y)}$]O$_2$ (0≤x<0.5, 0<γ, 0<ß, 0.5<γ+ß<1). Examples of the lithium transition metal oxide having a spinel-type crystal structure include Li$_x$Mn$_2$O$_4$ and Li$_x$Ni$_y$Mn$_{(2-y)}$O$_4$. Examples of the polyanion compound include LiFePO$_4$, LiMnPO$_4$, LiNiPO$_4$, LiCoPO$_4$, Li$_3$V$_2$(PO$_4$)$_3$, Li$_2$MnSiO$_4$, and Li$_2$CoPO$_4$F. Examples of the chalcogenide include titanium disulfide, molybdenum disulfide, and molybdenum dioxide. Atoms or polyanions in these materials may be partially substituted by atoms or anion species composed of other elements. The surfaces of these materials may be covered with other materials. In the positive active material layer, one of these materials may be used singly, or two or more of these materials may be mixed and used. In the positive composite layer, one of these compounds may be used singly, or two or more of these compounds may be mixed and used.

The conductive agent is not particularly limited so long as being a conductive material. Such a conductive agent can be selected from the materials exemplified in the negative electrode forming step.

Examples of the binder include: thermoplastic resins such as fluororesin (polytetrafluoroethylene (PTFE), polyvinylidene fluoride (PVDF), etc.), polyethylene, polypropylene, and polyimide; elastomers such as ethylene-propylene-diene rubber (EPDM), sulfonated EPDM, styrene-butadiene rubber (SBR), and fluororubber; and polysaccharide polymers.

Examples of the thickener include polysaccharide polymers such as carboxymethylcellulose (CMC) and methylcellulose. When the thickener has a functional group reactive with lithium, it is preferable to deactivate the functional group by methylation or the like in advance.

The filler can be selected from the materials exemplified in the negative electrode forming step.

The positive composite layer may be stacked on the positive electrode substrate directly or via an intermediate layer. The intermediate layer is a coating layer on the surface of the positive electrode substrate, and contains conductive particles such as carbon particles to reduce contact resistance between the positive electrode substrate and the positive active material layer. Similarly to the negative electrode, the configuration of the intermediate layer is not particularly limited but can be formed of, for example, a composition containing a resin binder and conductive particles.

[Electrode Assembly Forming Step]

In the electrode assembly forming step, an electrode assembly is formed using the positive electrode and the negative electrode. The electrode assembly is preferably a wound electrode assembly having a pair of curved portions facing each other and a flat portion located between the pair of curved portions. The electrode assembly forming step forms an electrode assembly alternately superposed by stacking or winding the positive electrode and the negative electrode with a separator to be described later interposed between the electrodes.

As a material of the separator, for example, a woven fabric, a nonwoven fabric, a porous resin film or the like is used. Among them, a porous resin film is preferable from the viewpoint of strength, and a nonwoven fabric is preferable from the viewpoint of liquid retention property of the nonaqueous electrolyte solution. As a main component of the separator, a polyolefin such as polyethylene or polypropylene is preferable from the viewpoint of strength, and polyimide, aramid or the like is preferable from the viewpoint of resistance to oxidation and decomposition. These resins may be composited. In addition, the separator may be a composite separator having a porous resin film and an inorganic porous layer.

In the electrode assembly, after the electrode assembly is housed and before the electrode assembly is sealed, when the electrode assembly has the hollow region in the central portion as viewed in the winding axis direction, when the gap is present between an outer surface of the flat portion of the electrode assembly and the inner surface of the case, or in the case of the combination thereof, the effect of the method for manufacturing an energy storage device can be further exhibited. As described above, when the wound electrode assembly includes the pair of curved portions facing each other and the flat portion located between the pair of curved portions, and after the electrode assembly is housed and before the electrode assembly is sealed, when the electrode assembly has the hollow region in the central portion as viewed in the winding axis direction, when the gap is present between the outer surface of the flat portion of the electrode assembly and the inner surface of the case, or in the case of the combination thereof, in the flat portion of the electrode assembly, the inter-electrode distance is easily widened toward the hollow region in the central portion or the gap on an outer surface side of the flat portion. Thus, the inter-electrode distance is more likely to be increased by the gas generated in these spaces by the decomposition of the additive or the oxidation-reduction decomposition of the electrolyte solution in the initial charge-discharge, and metal lithium electrodeposition is more likely to occur. According to the method for manufacturing an energy storage device, even in such a case, it is possible to manufacture an energy storage device having a high effect of suppressing occurrence of metal lithium electrodeposition associated with the increase in inter-electrode distance.

[Electrode Assembly Housing Step]

In the electrode assembly housing step, the electrode assembly in which the negative electrode and the positive electrode are stacked is housed in the case. As the case, a known metal case, a resin case or the like, which is usually used as a case of a nonaqueous electrolyte secondary battery, can be used. As the metal, for example, aluminum or an aluminum alloy can be used. The case includes, for example, a case body and a lid body capable of closing an opening of the case body.

It is preferable that when the case has the case body having a flat bottomed rectangular tube shape and the lid body, the electrode assembly is in direct or indirect contact with the inner surface of the case body after the case is sealed. Since the case body has a flat bottomed rectangular tube shape, when the inside of the case is in the negative pressure state, the force for pulling the case inward is generated, whereby the side surface of the case body is easily recessed. Since the electrode assembly is in direct or indirect contact with the inner surface of the case body, the side surface of the electrode assembly facing the side surface of the case body recessed by the negative pressure is pressurized in a thickness direction, so that the gas between the electrodes is more easily discharged to the outside of the electrode assembly. Therefore, the effect of suppressing the increase in inter-electrode distance can be further enhanced. Examples of the case where the electrode assembly is in indirect contact with the inner surface of the case body include a case where the energy storage device includes a spacer, a sheet or the like interposed between the case and the electrode assembly, and the inner surface of the case is in indirect contact with an outer surface of the electrode assembly with the spacer, the sheet or the like interposed therebetween. The material of the spacer, the sheet, or the like is not particularly limited so long as having an insulating property.

[Electrolyte Solution Housing Step]

In the electrolyte solution housing step, the electrolyte solution is housed in the case. As the electrolyte solution, when the energy storage device is a nonaqueous electrolyte solution secondary battery, a nonaqueous electrolyte solution is used. The electrolyte solution can be housed by a known method. In the nonaqueous electrolyte solution secondary battery, for example, a nonaqueous electrolyte solution is injected from an injection port provided in the case to house the electrolyte solution in the case.

(Nonaqueous Electrolyte Solution)

As the nonaqueous electrolyte solution, a known nonaqueous electrolyte solution normally used for a general nonaqueous electrolyte solution secondary battery (energy storage device) can be used. The nonaqueous electrolyte solution contains a nonaqueous solvent and an electrolyte salt dissolved in the nonaqueous solvent.

As the nonaqueous solvent, it is possible to use a known nonaqueous solvent usually used as a nonaqueous solvent of a general nonaqueous electrolyte solution for an energy storage device. Examples of the nonaqueous solvent include cyclic carbonate, chain carbonate, ester, ether, amide, sulfone, lactone, and nitrile. Among these, it is preferable to use at least the cyclic carbonate or the chain carbonate, and it is more preferable to use the cyclic carbonate and the chain carbonate in combination.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, catechol carbonate, 1-phenylvinylene carbonate, and 1,2-diphenylvinylene carbonate, and among these, EC or PC is preferable.

Examples of the chain carbonate include diethyl carbonate (DEC), dimethyl carbonate (DMC), ethyl methyl carbonate (EMC), and diphenyl carbonate, and among these, DMC or EMC is preferable.

As the electrolyte salt, it is possible to use a known electrolyte salt usually used as an electrolyte salt of a general nonaqueous electrolyte solution for an energy storage device. Examples of the electrolyte salt include a lithium salt, a sodium salt, a potassium salt, a magnesium salt, and an onium salt, but a lithium salt is preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a hydrocarbon group in which hydrogen is replaced by fluorine, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$. Among these, an inorganic lithium salt is preferable, and $LiPF_6$ is more preferable.

(Additive)

Various additives may be added to the electrolyte solution in order to improve the performance of the energy storage device as long as the effect of the present invention is not impaired.

When the electrolyte solution is a nonaqueous electrolyte solution, as the additive, an additive generally used in a nonaqueous electrolyte solution secondary battery can be used, and for example, in addition to an oxalato complex salt and a boric acid ester, aromatic compounds such as biphenyl, alkylbiphenyl, terphenyl, partly hydrogenated terphenyl, cyclohexylbenzene, t-butylbenzene, t-amylbenzene, diphenyl ether, and dibenzofuran; partial fluorination products of the aromatic compounds such as 2-fluorobiphenyl, o-cyclohexylfluorobenzene, and p-cyclohexylfluorobenzene; fluorine-containing anisole compounds, such as 2,4-difluoroanisole, 2,5-difluoroanisole, 2,6-difluoroanisole, and 3,5-difluoroanisole; vinylene carbonate, methylvinylene carbonate, ethylvinylene carbonate, fluoroethylene carbonate, difluoroethylene carbonate, trifluoropropylene carbonate, succinic anhydride, glutaric anhydride, maleic anhydride, citraconic anhydride, glutaconic anhydride, itaconic anhydride, cyclohexanedicarboxylic anhydride, ethylene sulfite, propylene sulfite, dimethyl sulfite, propane sultone, propene sultone, butane sultone, methyl methanesulfonate, busulfan, methyl toluenesulfonate, dimethyl sulfate, ethylene sulfate, sulfolane, dimethyl sulfone, diethyl sulfone, dimethylsulfoxide, diethyl sulfoxide, tetramethylene sulfoxide, diphenyl sulfide, 4,4'-bis(2,2-dioxo-1,3,2-dioxathiolane, 4-methylsulfonyloxymethyl-2,2-dioxo-1,3,2-dioxathiolane, thioanisole, diphenyl disulfide, dipyridinium disulfide, perfluorooctane, tristrimethylsilyl borate, tristrimethylsilyl phosphate, tetrakistrimethylsilyl titanate, and the like can be added alone or in combination of two or more thereof to the nonaqueous electrolyte.

Among the above additives, the oxalato complex salt generates a large amount of gas that is hardly dissolved in the electrolyte solution such as carbon monoxide in the initial charge-discharge. Thus, gas such as carbon monoxide is more likely to be accumulated between the electrodes, and the inter-electrode distance is likely to partially increase. According to the method for manufacturing an energy storage device, even in such a case, it is possible to manufacture an energy storage device having a high effect of suppressing the increase in inter-electrode distance. Examples of the oxalato complex salt include lithium difluoro bis oxalate phosphate [$LiPF_2(C_2O_4)_2$], lithium difluoro oxalate borate [$LiBF_2(C_2O_4)$], lithium bis oxalate borate [$LiB(C_2O_4)_2$], lithium tetrafluoro oxalate phosphate [$LiPF_4(C_2O_4)$], and lithium tris oxalate phosphate [$LiP(C_2O_4)_3$]. Among them, in particular, since the amount of generated gas in which lithium difluoro bis oxalate phosphate is hardly dissolved in an electrolyte solution such as carbon monoxide is large, the effect of the method for manufacturing an energy storage device can be further exhibited.

[Gas Housing Step]

In the gas housing step, a gas soluble in the electrolyte solution is housed in the case after the electrolyte solution housing step. Specifically, after the electrolyte solution is housed in the case, the gas is injected into the case from the injection port to house the gas soluble in the electrolyte solution in the case. The gas may be injected in a state where the pressure inside the case is reduced using a vacuum pump or the like. Here, "under reduced pressure" means that, for example, the pressure of the surplus space inside the case is less than the atmospheric pressure. The injection port may be provided separately from an injection port for injecting the electrolyte solution.

As described above, the energy storage device disclosed herein includes the electrolyte solution, the gas, and the case, the inside of the case has an atmosphere in the negative pressure state, and as one of preferable conditions for realizing the atmosphere in the negative pressure state, after the electrolyte solution is housed in the case, the gas is housed in the case. As described above, by injecting the gas into the case in which the electrolyte solution is housed, the gas is dissolved in the electrolyte solution after sealing, so that the pressure in the case can be effectively reduced, and the inside of the case can be in a preferable negative pressure state.

On the other hand, in an aspect in which the electrolyte solution is injected into the case after the gas is housed in the case, it is not preferable since most of the gas is dissolved in the electrolyte solution at the time of injection and the gas is excessively dissolved (for example, saturated and dissolved) in the electrolyte solution before sealing. If the gas is excessively dissolved in the electrolyte solution before sealing, it becomes difficult for the gas to be further dissolved in the electrolyte solution after sealing, and the pressure in the case may not be effectively reduced.

Preferably, the electrolyte solution may be housed in the case and then precharged before sealing. Then, after the pressure in the case is once reduced using a vacuum pump, the gas may be injected so that the pressure is around the atmospheric pressure. The pressure immediately after the gas injection is one important factor from the viewpoint of making the inside of the case into an atmosphere in a preferable negative pressure state. Preferably, the gas is injected so that the pressure immediately after the gas injection is 0.1 MPa or more and 0.2 MPa or less (more preferably 0.1 MPa or more and 0.15 MPa or less, still more preferably 0.1 MPa or more and 0.12 MPa or less, and particularly preferably 0.1 MPa or more and 0.11 MPa or less). By injecting the gas so that the pressure immediately after the gas injection is around the atmospheric pressure in this manner, the disadvantage that the gas is excessively dissolved in the electrolyte solution before sealing can be eliminated or alleviated, and the pressure in the case can be effectively lowered after sealing.

A housing amount of the gas soluble in the electrolyte solution is preferably 40 vol % or more, more preferably 70 vol % or more, and may be, for example, 95 vol % or more with respect to the volume of the surplus space in the case from the viewpoint of further reducing the pressure in the case. The housing amount of the gas soluble in the electrolyte solution may be less than 100 vol % with respect to the volume of the surplus space in the case. The technology disclosed herein can be preferably implemented in an aspect in which the housing amount of the gas soluble in the electrolyte solution is 70 vol % or more and less than 100 vol % (preferably 80 vol % or more and 95 vol % or less) with respect to the volume of the surplus space in the case. Here, the "volume of the surplus space in the case" means a volume obtained by subtracting the volume of the structure such as the electrode assembly, the electrolyte solution, and the current collector from an internal volume of the case. The volume of the electrode assembly means an actual volume of constituent elements (active material, separator, etc.) of the electrode, and does not include voids present between the active materials and in the separator. That is, the volume of the surplus space in the case means the volume of gas that can be housed in the case under atmospheric pressure at 25° C.

From the viewpoint of further reducing the pressure in the case, the content of the gas soluble in the electrolyte solution housed in the case is preferably 80 vol % or more, more preferably 98 vol % or more, and still more preferably 100 vol % with respect to the housing amount of the total gas housed in the case. The content of the gas soluble in the electrolyte solution may be 80 vol % or less % with respect to the housing amount of the total gas housed in the case from the viewpoint of handleability of the gas.

When the electrolyte solution is a nonaqueous electrolyte solution mainly composed of carbonate, examples of a gas soluble in the nonaqueous electrolyte solution include carbon dioxide gas (solubility of 5 $cm^3$ in 1 $cm^3$ of nonaqueous electrolyte solution at 25° C. under 1 atm). When the electrolyte solution is a nonaqueous electrolyte solution mainly composed of carbonate, examples of a gas hardly soluble or insoluble in the nonaqueous electrolyte solution include oxygen gas, nitrogen gas, hydrogen, and methane.

When the main component of the electrolyte solution is carbonate, the gas is preferably carbon dioxide. When the main component of the electrolyte solution is carbonate, carbon dioxide which is easily handled and available can be used as the gas.

[Adsorbing Member Housing Step]

The method for manufacturing the energy storage device preferably further includes the adsorbing member housing step. In the adsorbing member housing step, a member capable of adsorbing gas is housed in the case. The method for manufacturing the energy storage device further includes the adsorbing member housing step, so that an amount of absorption of the gas increases, and the negative pressure inside the case also increases, whereby the gas between the electrodes is more easily discharged to the outside of the electrode assembly, and therefore, the effect of suppressing the increase in inter-electrode distance can be further improved. Since the gas is also absorbed by the adsorbable member, it is possible to shorten the time until the inside of the case attains an atmosphere in the negative pressure state after the case is sealed.

Examples of the member capable of adsorbing gas include silica, zeolite, active carbon, and alumina. The member can be housed as a member such as a core member disposed in the central portion of the electrode assembly, or a sheet or a spacer disposed between the electrode assembly and the case.

[Sealing Step]

In the sealing step, the case is sealed in the state where the gas soluble in the electrolyte solution is housed in the case. Specifically, a nonaqueous electrolyte solution secondary battery can be obtained by housing the gas in the case and then sealing the injection port. The injection port is sealed by, for example, closing the injection port with a sealing member and fixing the sealing member by laser welding or the like.

The pressure in the case when the dissolution of the gas in the electrolyte solution becomes an equilibrium state after sealing is preferably 0.02 MPa or more and 0.09 MPa or less at 25° C. from the viewpoint of effectively suppressing the increase in inter-electrode distance. The pressure in the case immediately after sealing is preferably 0.07 MPa or more and 0.10 MPa or less. That is, most of the gas is not dissolved in the electrolyte solution immediately after sealing, and the pressure in the case can be reduced by dissolving the gas in the electrolyte solution after sealing.

An elapsed time from completion of housing of the gas soluble in the electrolyte solution to sealing of the injection port is preferably 1 hour or less from the viewpoint of reducing the amount of the gas dissolved in the electrolyte solution before sealing or discharged to the outside of the case through the injection port by diffusion. The elapsed time is preferably 30 minutes or less (for example, 1 minute or more and 30 minutes or less), more preferably 20 minutes or less, still more preferably 15 minutes or less, and particularly preferably 10 minutes or less (for example, 5 minutes or less). By shortening the elapsed time from completion of housing of the gas soluble in the electrolyte solution to sealing of the injection port, the disadvantage that the gas is excessively dissolved (typically, saturated and dissolved) in the electrolyte solution before sealing can be eliminated or alleviated, and the pressure in the case can be effectively reduced after sealing.

The method may include a step of temporarily sealing the injection port before the step of sealing the injection port after housing the gas in the case. The step of temporarily sealing the injection port is, for example, a step of temporarily closing the injection port using a rubber plug member or the like. By including the step of temporarily sealing the injection port, it is possible to suppress release of the gas housed in the case to the outside of the case through the injection port due to diffusion. In this case, in the step of sealing the injection port, the injection port may be closed with a sealing member after the plug member or the like is removed, and the sealing member may be fixed by laser welding or the like. In the step of sealing the injection port, a sealing member that covers the injection port together with a plug member or the like that closes the injection port may be disposed, and the sealing member may be fixed by laser welding or the like.

According to the method for manufacturing an energy storage device, it is possible to manufacture an energy storage device having a high effect of suppressing the increase in inter-electrode distance.

<Energy Storage Device>

The energy storage device includes an electrode assembly in which a negative electrode and a positive electrode are stacked, an electrolyte solution, a gas soluble in the electrolyte solution, and a sealable case for housing the electrode assembly, the electrolyte solution, and the gas. The inside of the case has the atmosphere in the negative pressure state. As the electrode assembly, it is preferable to form a wound electrode assembly in which a positive electrode and a negative electrode stacked with a separator interposed between the electrodes are wound. The electrolyte solution is interposed between the positive electrode and the negative electrode in a state where the separator is impregnated with the electrolyte solution. With the energy storage device having the above configuration, the gas soluble in the electrolyte solution is housed in the case, and after the case is sealed, the gas is dissolved in the electrolyte solution. As a result, pressure inside the case decreases, and the inside of the case is brought into the negative pressure state, that is, the force for pulling the case inward is generated, whereby the gas present between the electrodes is discharged to the outside of the electrode assembly.

In a preferred aspect, the electrode assembly is a wound electrode assembly including a pair of curved portions facing each other and a flat portion located between the pair of curved portions, and the electrode assembly has a hollow region in a central portion as viewed in a winding axis direction, a gap is present between an outer surface of the flat portion of the electrode assembly and an inner surface of the case, or a combination thereof.

In a preferred aspect, a main component of the electrolyte solution is carbonate, and the gas is carbon dioxide.

In a preferred aspect, the electrolyte solution contains an oxalato complex salt.

In a preferred aspect, the case has a flat bottomed rectangular tube-shaped case body and a lid body, and the electrode assembly is in direct or indirect contact with an inner surface of the case body.

In a preferred aspect, the member capable of adsorbing the gas is further provided inside the case.

In a preferred aspect, the inside of the case has an atmosphere in a negative pressure state of 0.02 MPa or more and 0.09 MPa or less (preferably 0.04 MPa or more and 0.07 MPa or less).

Figure 2:
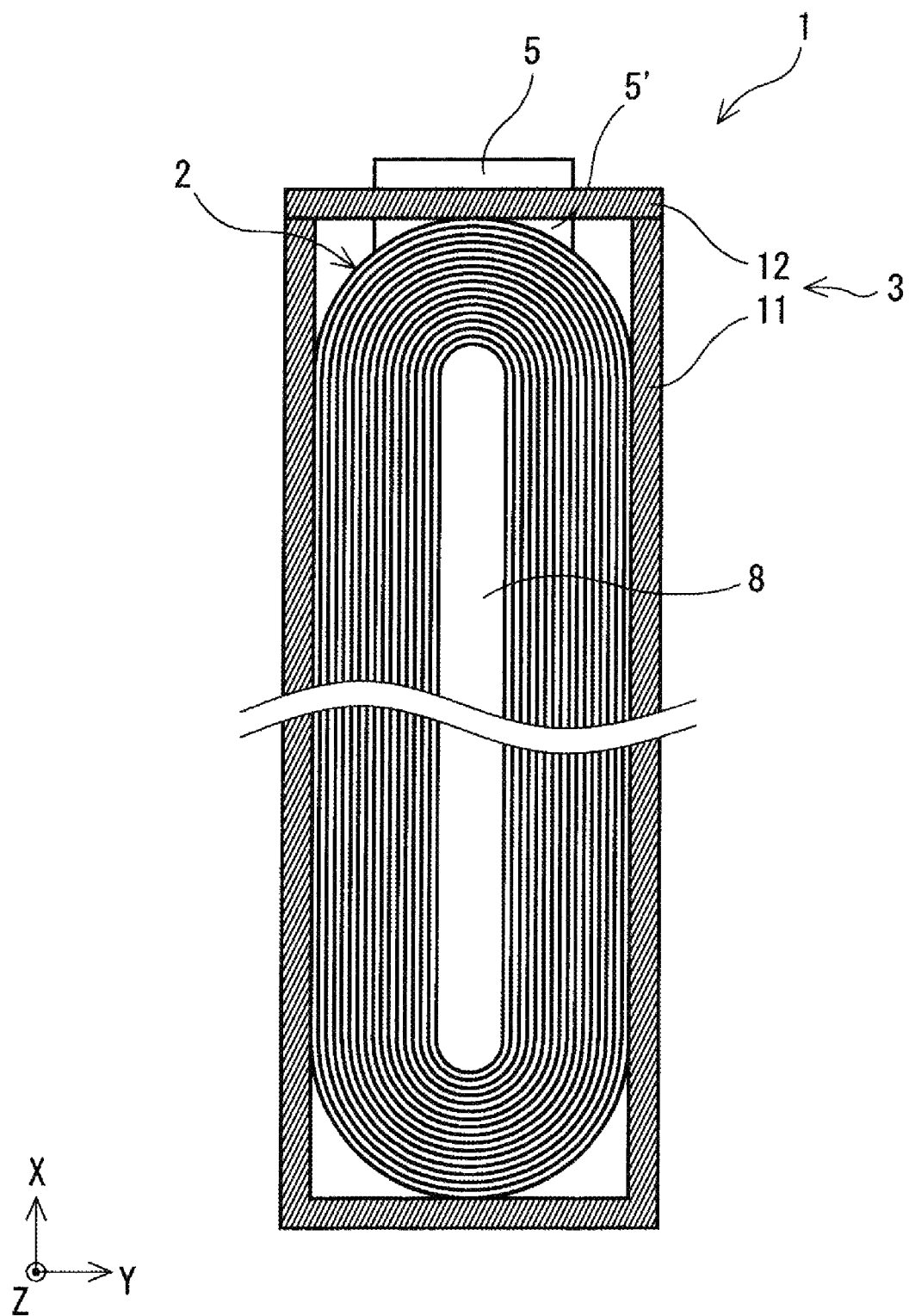
FIG. 2 is a schematic cross-sectional view of the energy storage device in one embodiment of the present invention.

Next, a specific configuration example of an energy storage device according to one embodiment of the present invention will be described. FIG. 1 is a schematic exploded perspective view illustrating an electrode assembly and a case of a nonaqueous electrolyte solution secondary battery as an energy storage device according to one embodiment of the present invention. FIG. 2 is a schematic cross-sectional view of the nonaqueous electrolytic secondary battery in FIG. 1. An energy storage device 1 includes an electrode assembly 2, a positive current collector 4' and a negative current collector 5', which are connected to both ends of the electrode assembly 2, respectively, and a case 3 for housing the current collectors. As a mode in which the effect of the energy storage device 1 can be further exhibited, the electrode assembly 2 has a hollow region in a central portion 8.

As shown in FIG. 1, the energy storage device 1 includes a case 3, an electrode assembly 2 housed in the case 3, and a positive electrode terminal 4 and a negative electrode terminal 5 provided in the case 3. The case 3 includes a flat bottomed rectangular tube-shaped case body 11 and an elongated rectangular plate-like lid body 12 capable of closing an elongated rectangular opening of the case body 11.

The lid body 12 is provided with the positive electrode terminal 4 and the negative electrode terminal 5 that conduct electricity to the outside. The positive electrode is electrically connected to the positive electrode terminal 4 via the positive current collector 4' connected to the positive electrode substrate, and the negative electrode is electrically connected to the negative electrode terminal 5 via the negative current collector 5' connected to the negative electrode substrate.

The details of the electrode assembly, the electrolyte solution, the gas soluble in the electrolyte solution, the case, and the like constituting the nonaqueous electrolyte secondary battery are as described above.

Other Embodiments

The energy storage device of the present invention is not limited to the above-described embodiment.

In the above embodiment, the energy storage device is a nonaqueous electrolyte solution secondary battery, but other energy storage devices may be used. Examples of the other energy storage devices include capacitors (electric double-layer capacitor, lithium ion capacitor).

Although the wound electrode assembly has been used in the above embodiment, a laminated electrode assembly may be provided which is formed of a separator where a plurality of sheet bodies having a positive electrode, a negative electrode, and a separator are laminated.

In the above embodiment, although the electrode assembly has the hollow region in the central portion, the electrode assembly having no hollow region in the central portion may be provided, or a gap may be present between the inner surface of the case body and the outer surface of the flat portion of the electrode assembly.

In the above embodiment, although the nonaqueous electrolyte solution is used as the electrolyte solution of the nonaqueous electrolyte secondary battery, the method for manufacturing the energy storage device can also be applied to a nickel hydrogen battery or the like using an aqueous electrolyte solution. For example, in the case of the nickel hydrogen battery, an alkali solution such as a concentrated potassium hydroxide aqueous solution is used as the electrolyte solution. When the electrolyte solution is an aqueous electrolyte solution, examples of the gas soluble in the nonaqueous electrolyte solution include ammonia (solubility of 700 $cm^3$ in 1 $cm^3$ of water at 20° C. under 1 atm). When the electrolyte solution is an aqueous electrolyte solution, examples of a gas hardly soluble or insoluble in the aqueous electrolyte solution include oxygen gas and nitrogen gas.

The present invention can also be realized as an energy storage apparatus including a plurality of the energy storage devices. An energy storage unit can be constituted using one or a plurality of energy storage devices (cells) of the present invention, and an energy storage apparatus can be constituted using the energy storage unit. In this case, the technique of the present invention may be applied to at least one energy storage device included in the energy storage unit or the energy storage apparatus. The energy storage apparatus can be used as a power source for an automobile, such as an electric vehicle (EV), a hybrid vehicle (HEV), or a plug-in hybrid vehicle (PHEV). Further, the energy storage apparatus can be used for various power supply apparatuses such as an engine starting power supply apparatus, an auxiliary power supply apparatus, and uninterruptible power systems (UPSs).

Figure 3:
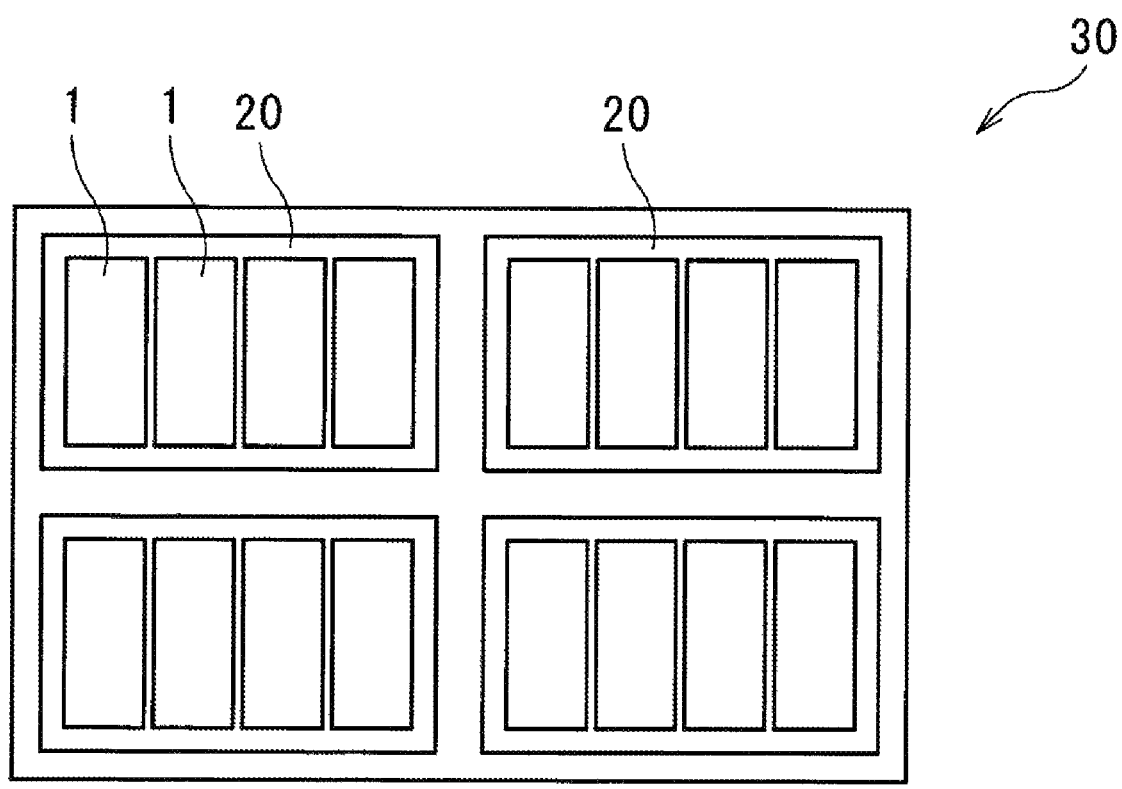
FIG. 3 is a schematic view illustrating an energy storage apparatus configured by aggregating a plurality of the energy storage devices in one embodiment of the present invention.

FIG. 3 illustrates an example of an energy storage apparatus 30 formed by assembling energy storage units 20 in each of which two or more electrically connected energy storage devices 1 are assembled. The energy storage apparatus 30 may include a busbar (not illustrated) for electrically connecting two or more energy storage devices 1 and a busbar (not illustrated) for electrically connecting two or more energy storage units 20. The energy storage unit 20 or the energy storage apparatus 30 may include a state monitor (not illustrated) for monitoring the state of one or more energy storage devices.

EXAMPLES

Hereinafter, the present invention will be described more specifically by way of examples, but the present invention is not limited to the following examples.

Examples 1 and 2, and Comparative Examples 1 and 2

(1) Negative Electrode Forming Step

A negative composite paste containing hardly graphitizable carbon as the negative active material and polyvinylidene fluoride (PVDF) as a binder, and using n-methyl-2-pyrrolidone (NMP) as a dispersion medium, was prepared. A mass ratio of the negative active material and the binder was 93.0:7.0. The negative composite paste was applied onto both surfaces of an 8 μm-thick copper foil substrate and dried to form a negative composite layer, and thus to obtain negative electrodes of Examples 1 and 2 and Comparative Examples 1 and 2. The coating amount of the negative composite (obtained by evaporating the dispersion medium from the negative composite paste) per unit area of one surface after drying was set to 0.40 g/100 $cm^2$.

(2) Positive Electrode Forming Step

A positive composite paste, containing $LiNi_{1/3}Co_{1/3}Mn_{1/3}O_2$ as the positive active material, polyvinylidene fluoride (PVDF) as a binder, and acetylene black as a conductive agent and using n-methyl-2-pyrrolidone (NMP) as a dispersion medium, was prepared. A mass ratio of the positive active material, the binder, and the conductive agent was 91.0:4.5:4.5. The positive composite paste was applied onto both surfaces of a 15 μm-thick aluminum foil substrate and dried to form a positive active material layer, and thus to obtain positive electrodes of Examples 1 and 2 and Comparative Examples 1 and 2. The coating amount of the positive composite (obtained by evaporating the dispersion medium from the positive composite paste) per unit area of one surface after drying was set to 0.86 g/100 $cm^2$.

(3) Electrode Assembly Forming Step

The negative electrode, the positive electrode, and a 21 μm-thick polyethylene separator were wound with a hollow winding core as the center in a state of being stacked, so that electrode assemblies of Examples 1 and 2 and Comparative Examples 1 and 2 were prepared. The hollow winding core was formed into a shape in which a hollow region was formed inside by heat-welding a polypropylene sheet having a thickness of 150 μm in a state of being rolled into an elliptic cylinder shape. By using such a hollow winding core, an electrode assembly in which a hollow region having an average thickness of 1 mm was formed at the center of the electrode assembly was constituted. The electrode assembly was wound so as to form a wound electrode assembly having a pair of curved portions facing each other and a flat portion located between the pair of curved portions. The average thickness of the hollow region means an average length of the hollow region in the thickness direction (Y-axis direction in FIG. 2) of the electrode assembly.

(4) Electrode Assembly Housing Step

The electrode assembly was housed in a flat bottomed rectangular tube-shaped case body made of an aluminum alloy. In all the energy storage devices of Examples 1 and 2 and Comparative Examples 1 and 2, an outer surface of the wound electrode assembly was brought into contact with the inner surface of the case body through a polypropylene insulating sheet having a thickness of 150 μm.

(5) Electrolyte Solution Housing Step

In the energy storage devices of Example 2 and Comparative Example 2, a nonaqueous electrolyte solution was prepared by dissolving $LiPF_6$ at 1.2 mol/L in a nonaqueous solvent obtained by mixing PC, EMC and DMC at a volume ratio of 30:35:35. In the energy storage devices of Example 1 and Comparative Example 1, a nonaqueous electrolyte solution was prepared by further dissolving lithium difluorobisoxalate phosphate [$LiPF_2(C_2O_4)_2$] as an additive in the nonaqueous electrolyte solution so that the content was 0.5 mass %. 40 $cm^3$ of each prepared electrolyte solution was housed in the case. The inner volume of the case was 120 $cm^3$, the volume of the electrode assembly was 50 $cm^3$, and the sum of the volumes of the structure (current collector and the like) other than the electrode assembly and the electrolyte solution was 50 $cm^3$. That is, the volume of the surplus space in the case was 20 $cm^3$.

(6) Gas Housing Step

After the electrolyte solution was housed, preliminary charge was performed. Thereafter, in the energy storage devices of Examples 1 and 2, the pressure in the case was reduced to 0.01 MPa using a vacuum pump, and then 18 $cm^3$ of carbon dioxide gas as the gas soluble in the electrolyte solution was housed in the case. The content of carbon dioxide in the carbon dioxide gas was 99.5 vol %, and nitrogen, oxygen, and methane were contained as components other than carbon dioxide. That is, the housing amount of the gas soluble in the electrolyte solution was 89.5 vol % with respect to the volume of the surplus space in the case. The energy storage devices of Comparative Examples 1 and 2 were similar to the energy storage devices of Examples 1 and 2 except that air was housed in the case instead of the carbon dioxide gas.

(7) Sealing Step

After 5 minutes from the housing of the carbon dioxide gas or the air in the case, the injection port was sealed to seal the case, and nonaqueous electrolyte energy storage devices of Examples 1 and 2 and Comparative Examples 1 and 2 as test cells were obtained. The pressure in the case after a lapse of 48 hours after sealing was 0.06 MPa in Example 1, 0.11 MPa in Comparative Example 1, 0.06 MPa in Example 2, and 0.11 MPa in Comparative Example 2 at 25° C.

[Evaluation]

(Measurement of Pore Amount of Electrode Assembly)

A pore amount of the electrode assembly of each of the energy storage devices of Examples 1 and 2 and Comparative Examples 1 and 2 after a lapse of 48 hours from the time of sealing was measured by the following procedure.

(1) Acquisition of Cross-Sectional Image of Electrode Assembly

Microfocus X-ray CT (inspeXio SMX-225 CTFPD HR manufactured by Shimadzu Corporation) was used to acquire a cross-sectional image of the electrode assembly in the energy storage device to be measured. As conditions for acquiring the cross-sectional image, an image taking mode was three-dimensional CT, an image size was 512 pixels in both vertical and horizontal directions, a slice thickness was 77 μm, a distance between slices was 77 μm, a voxel size was 77 μm, the field of vision was 39.3 mmφ, and the number of views was 1800. In each energy storage device, a cross-sectional image of a YZ plane of the electrode assembly was acquired, and the obtained cross-sectional image was stored as an image file.

(2) Cut-Out of Contour of Electrode Assembly

The contour of the electrode assembly was cut out from the acquired image of the cross-sectional image of the electrode assembly by using an image cutting function of an image editing software Adobe Photoshop Elements 11.

(3) Binarization Processing

The pore amount (number of pixels) of the electrode assembly was calculated using image processing software WinROOF 2013 with respect to the cross-sectional image of the electrode assembly from which the contour was cut out. Here, the pore amount was calculated for a portion excluding the hollow region located at the center of the electrode assembly and the winding core in the cross-sectional image of the electrode assembly from which the contour was cut out. Specifically, first, binarization processing was performed by setting, as a threshold, a density smaller by 60% than a density at which intensity of brightness becomes maximum. On a lower side of the density of brightness, a pixel population of 15 pixels or less was regarded as noise, and only pixel populations of 16 pixels or more were summed to calculate the pore amount (number of pixels) of the electrode assembly.

The pore amount (number of pixels) of the electrode assembly was compared between Example 1 and Comparative Example 1 in which lithium difluorobisoxalate phosphate was added as an additive to the electrolyte solution, and Example 2 and Comparative Example 2 in which the additive was not added, thereby obtaining a reduction rate (%) of the pore amount of the electrode assembly by housing carbon dioxide gas. The evaluation results are shown in Table 1.

TABLE 1

|  | Gas soluble in electrolyte solution Carbon dioxide gas injection amount ($cm^3$) | Electrolyte solution additive Lithium difluoro bis oxalate phosphate (mass %) | Pore amount (pixel) | Pore reduction rate by carbon dioxide gas (%) |
|---|---|---|---|---|
| Comparative Example 1 | — | 0.5 | 38819 | — |
| Example 1 | 18 | 0.5 | 13167 | 66 |
| Comparative Example 2 | — | — | 22526 | — |
| Example 2 | 18 | — | 10364 | 54 |

Figure 4:
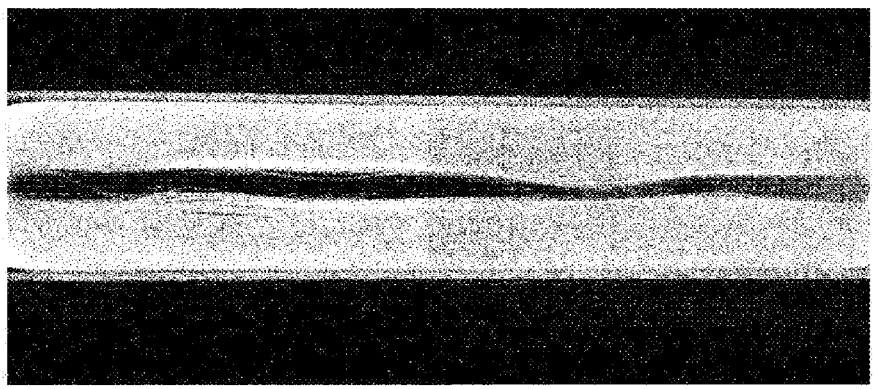
FIG. 4 is a cross-sectional image of an electrode assembly of the energy storage device in one embodiment of the present invention.
Figure 4:
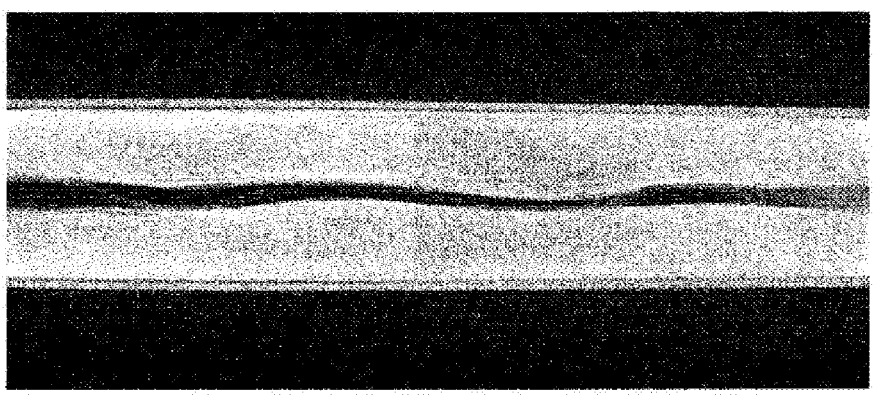
Figure 4:
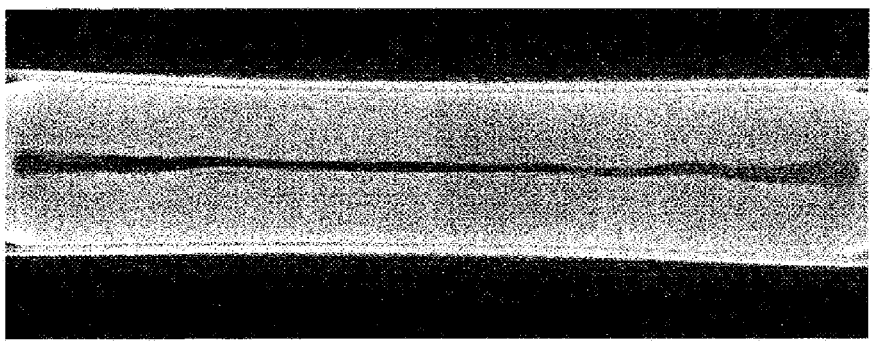
Figure 4:
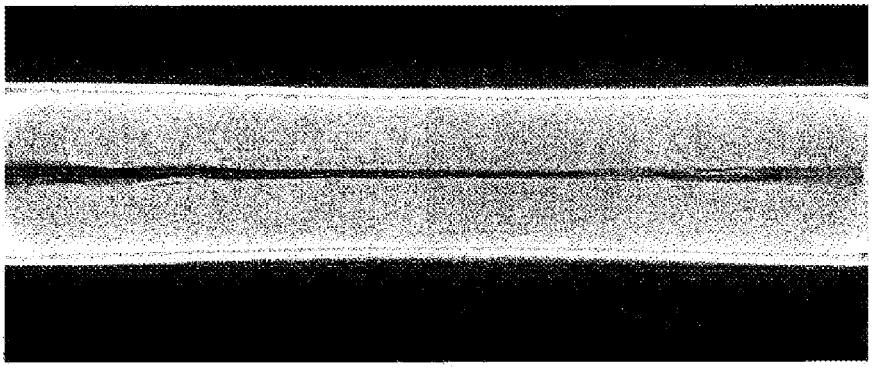

FIG. 4 shows a cross-sectional image of the electrode assembly on an XY plane in the energy storage devices of Examples 1 and 2 and Comparative Examples 1 and 2. As shown in FIG. 4, in the electrode assemblies of Comparative Examples 1 and 2 not housing carbon dioxide gas, a plurality of portions where the inter-electrode distance is large even in visual observation are observed. On the other hand, in the electrode assemblies of Examples 1 and 2 housing carbon dioxide gas, the portion where the inter-electrode distance is large is reduced as compared with Comparative Examples 1 and 2. Unlike Comparative Examples 1 and 2, in the energy storage devices of Examples 1 and 2, the inner surface of the case body was in contact with the outer surface of the flat portion of the electrode assembly with the insulating sheet interposed therebetween in a state where the inner surface of the case body was recessed inward. It is considered that when the inside of the case is in the negative pressure state, the inner surface of the case body in the state of being recessed inward is in contact with the outer surface of the electrode assembly, so that a gas which is hardly dissolved in the electrolyte solution present between the electrodes is easily discharged to the outside of the electrode assembly. The cross-sectional image was acquired using Microfocus X-ray CT (inspeXio SMX-225 CT FPDHR manufactured by Shimadzu Corporation) in the same manner as in the calculation of the pore amount of the electrode assembly.

As a result of measuring the pore amount of the electrode assembly using image processing, as shown in Table 1, in Examples 1 and 2 in which the gas soluble in the electrolyte solution was housed in the case, the pore amount of the electrode assembly was largely suppressed as compared with Comparative Examples 1 and 2 in which the gas was not housed in the case. From this, it can be understood that the energy storage device has a high effect of suppressing the increase in inter-electrode distance. From the results of determining the reduction rate (%) of the pore amount of the electrode assembly by housing carbon dioxide gas between Example 1 and Comparative Example 1 in which lithium difluorobisoxalate phosphate was added as an additive to the electrolyte solution and Example 2 and Comparative Example 2 in which the additive was not added, Example 1 in which the additive in which the amount of generated gas hardly dissolved in the electrolyte solution such as carbon monoxide was large was added had a larger reduction rate (%) of the pore amount of the electrode assembly. From this, it is understood that the effect of the energy storage device is further exhibited when the energy storage device contains the additive in which the distance between the electrodes tends to be large.

As described above, it is presumed that in the method for manufacturing an energy storage device, the effect of suppressing the increase in inter-electrode distance is high.

INDUSTRIAL APPLICABILITY

The present invention is suitably used as an energy storage device including a nonaqueous electrolyte solution secondary battery used as a power source for electronic devices such as personal computers and communication terminals, automobiles, and the like.

DESCRIPTION OF REFERENCE SIGNS

1: Energy storage device
2: Electrode assembly
3: Case
4: Positive electrode terminal
4': Positive current collector
5: Negative electrode terminal
5': Negative current collector
8: Central portion
11: Case body
12: Lid body
20: Energy storage unit
30: Energy storage apparatus

The invention claimed is:

1. A method for manufacturing an energy storage device comprising:
   housing, in a case, an electrode assembly in which a negative electrode and a positive electrode are stacked;
   housing an electrolyte solution in the case;
   housing a gas, soluble in the electrolyte solution, in the case after the electrolyte solution is housed in the case; and
   sealing the case in a state where the gas soluble in the electrolyte solution is housed in the case,
   wherein an elapsed time from completion of housing of the gas soluble in the electrolyte solution to sealing of the case is within 30 minutes,
   the case has a flat bottomed rectangular tube-shaped case body and a lid body, the flat bottomed rectangular tube-shaped case body including a bottom surface, an opening opposite to the bottom surface and closed with the lid body after the case is sealed, and a side surface extending between the bottom surface and the opening,
   after the case is sealed, a side surface of the electrode assembly is in direct contact with an inner surface of the side surface of the flat bottomed rectangular tube-shaped case body, or the side surface of the electrode assembly is indirect contact with the inner surface of the side surface of the flat bottomed rectangular tube-shaped case body via a spacer or a sheet having an insulating property interposed between the side surface of the electrode assembly and the inner surface of the side surface of the flat bottomed rectangular tube-shaped case body, and
   after the case is sealed, the gas is dissolved in the electrolyte solution, thereby an inside of the case is brought into a negative pressure state, and the side surface of the flat bottomed rectangular tube-shaped case body is recessed inward to pressurize the side surface of the electrode assembly in a thickness direction of the electrode assembly.

2. The method for manufacturing an energy storage device according to claim 1, wherein the electrode assembly is a wound electrode assembly including a pair of curved portions facing each other and a flat portion located between the pair of curved portions, and
   after the electrode assembly is housed and before the case is sealed, the electrode assembly has a hollow region in a central portion as viewed in a winding axis direction, and/or a gap is present between an outer surface of the flat portion of the electrode assembly and an inner surface of the case.

3. The method for manufacturing an energy storage device according to claim 1, wherein a main component of the electrolyte solution is carbonate, and the gas is carbon dioxide.

4. The method for manufacturing an energy storage device according to claim 3, wherein the electrolyte solution contains an oxalato complex salt.

5. The method for manufacturing an energy storage device according to claim 1, further comprising housing a member adsorbing the gas in the case.

6. The method for manufacturing an energy storage device according to claim 5, wherein the member adsorbing the gas includes at least one selected from the group consisting of silica, zeolite, active carbon and alumina.

7. The method for manufacturing an energy storage device according to claim 5, wherein the member adsorbing the gas is housed as a core member disposed in a central portion of the electrode assembly, or the sheet or the spacer disposed between the electrode assembly and the case.

8. The method for manufacturing an energy storage device according to claim 5, wherein
 the member adsorbing the gas is housed as a core member disposed in a central portion of the electrode assembly, or the sheet or the spacer disposed between the electrode assembly and the case, and
 the member adsorbing the gas includes at least one selected from the group consisting of silica, zeolite, active carbon and alumina.

9. The method for manufacturing an energy storage device according to claim 1, further comprising:
 after housing the electrolyte solution in the case, performing a preliminary charge, and then reducing a pressure inside the case,
 wherein after the pressure inside the case is reduced, the gas soluble in the electrolyte solution is then housed in the case.

10. The method for manufacturing an energy storage device according to claim 1, wherein the gas soluble in the electrolyte solution is housed in the case in such a way that a pressure inside the case immediately after the gas is housed is 0.1 MPa or more and 0.2 MPa or less.

11. The method for manufacturing an energy storage device according to claim 1, wherein the electrode assembly is a wound electrode assembly including a pair of curved portions facing each other and a flat portion located between the pair of curved portions, and
 the side surface of the electrode assembly, which is in direct or indirect contact with the inner surface of the side surface of the flat bottomed rectangular tube-shaped case body after the case is sealed, is an outermost surface of the flat portion.

\* \* \* \* \*